US009664255B2

(12) United States Patent
Sugano et al.

(10) Patent No.: US 9,664,255 B2
(45) Date of Patent: May 30, 2017

(54) POWER UNIT FOR SADDLE-TYPE VEHICLE

(71) Applicant: HONDA MOTOR CO., LTD., Tokyo (JP)

(72) Inventors: Takeshi Sugano, Wako (JP); Yukihiro Tsubakino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 506 days.

(21) Appl. No.: 14/225,581

(22) Filed: Mar. 26, 2014

(65) Prior Publication Data

US 2014/0290405 A1 Oct. 2, 2014

(30) Foreign Application Priority Data

Mar. 29, 2013 (JP) ................. 2013-071742

(51) Int. Cl.
*F16H 3/02* (2006.01)
*F16H 63/18* (2006.01)
*F16H 3/089* (2006.01)

(52) U.S. Cl.
CPC ............ *F16H 3/02* (2013.01); *F16H 63/18* (2013.01); *F16H 3/089* (2013.01); *F16H 2200/003* (2013.01); *F16H 2200/0052* (2013.01); *Y10T 74/19251* (2015.01)

(58) Field of Classification Search
CPC .................................. F16H 3/02; F16H 63/18
USPC ....................................................... 74/337.5
See application file for complete search history.

(56) References Cited

U.S. PATENT DOCUMENTS

| 2008/0103020 A1* | 5/2008 | Inui ................... F16H 61/18 477/126 |
| 2009/0222182 A1* | 9/2009 | Tomoda ............. F16D 25/086 701/67 |
| 2010/0050805 A1* | 3/2010 | Hayakawa .......... F16H 63/18 74/473.28 |
| 2011/0226080 A1 | 9/2011 | Ieda et al. |
| 2012/0240702 A1* | 9/2012 | Tokito ................ F16H 59/70 74/337.5 |

FOREIGN PATENT DOCUMENTS

| JP | 2008-38922 | * 2/2008 |
| JP | 2011-196433 A | 10/2011 |

\* cited by examiner

*Primary Examiner* — William C Joyce
(74) *Attorney, Agent, or Firm* — Birch, Stewart, Kolasch & Birch, LLP

(57) ABSTRACT

In a power unit for a saddle-type vehicle a locking pin on a shift drum side is fixed to a shift spindle and a detection shaft of a shift position sensor is interlocked and connected with the shift drum, the friction surface between the shift arm and the locking pin is reduced with suppression of the lowering of the rigidity of the shift arm to enable smooth gear shifting. An engagement hole in a shift arm allows insertion and engagement of a locking pin and has an elongated hole shape extending along one diameter line of a shift spindle. An insertion hole in the shift arm has an arc shape centered at the center axis line of the shift spindle to allow insertion of an interlocking shaft coaxially connected to the shift drum to be incapable of rotation relative to it.

19 Claims, 8 Drawing Sheets

POWER UNIT FOR SADDLE-TYPE VEHICLE

CROSS-REFERENCE TO RELATED APPLICATIONS

The present application claims priority under 35 USC 119 to Japanese Patent Application No. 2013-071742 filed Mar. 29, 2013 the entire contents of which are hereby incorporated by reference.

BACKGROUND OF THE INVENTION

1. Field of the Invention

The present invention relates to a power unit for a saddle-type vehicle in which gear trains of a plurality of shift stages one of which is selectively established according to the rotation of a shift drum are provided in a power train system between a drive source that exerts a driving force and a drive wheel. A change mechanism that rotates the shift drum includes a shift spindle that rotates according to the input of a gear shifting operating force and a shift arm that engages with a locking pin provided on the shift drum side and is fixed to the shift spindle. A detection shaft of a shift position sensor that detects the rotational position of the shift drum is interlocked and connected with the shift drum.

2. Description of Background Art

Such a power unit for a saddle-type vehicle is known. See, for example, Japanese Patent Laid-Open No. 2011-196433. In this power unit, an interlocking shaft coaxial with the rotational axis line of the shift drum is disposed so as to penetrate the shift arm in order to be interlocked and connected with the shift position sensor. Because the shift arm swings, an insertion hole with an arc shape for allowing the interlocking shaft to penetrate therethrough is made in the shift arm. The insertion hole is larger than the interlocking shaft in size. Meanwhile, the shift arm is engaged with the locking pin on the shift drum side, and the locking pin is engaged with a concave part formed in matching with the outer diameter of the locking pin by bending the tip part of the shift arm in order to ensure the rigidity of the shift arm.

However, as disclosed in the above-mentioned Japanese Patent Laid-Open No. 2011-196433, in the structure in which the locking pin is engaged with the concave part formed in the shift arm, there is a possibility that friction increases are attributed to the pressing of the shift arm by the locking pin in the axial direction. For smoother gear shifting, a structure in which the shift arm is engaged with the locking pin with a surface with less friction is preferable. However, there is a concern that the rigidity of the shift arm lowers if merely an engagement hole for engagement with the locking pin is formed in the shift arm having the arc-shaped insertion hole in which the interlocking shaft to be interlocked and connected the shift position sensor is inserted.

SUMMARY AND OBJECTS OF THE INVENTION

According to an embodiment of the present invention, is made in view of such circumstances and an object thereof is to provide a power unit for a saddle-type vehicle in which the friction surface between a shift arm and a locking pin is reduced with suppression of the lowering of the rigidity of the shift arm to enable smooth gear shifting.

According to an embodiment of the present invention, the following configuration in a power unit for a saddle-type vehicle in which gear trains of a plurality of shift stages one of which is selectively established according to rotation of a shift drum are provided in a power train system between a drive source that exerts a driving force and a drive wheel. A change mechanism for rotating the shift drum includes a shift spindle that rotates according to input of a gear shifting operating force and a shift arm that engages with a locking pin provided on the side of the shift drum and is fixed to the shift spindle. A detection shaft of a shift position sensor for detecting the rotational position of the shift drum is interlocked and connected with the shift drum. More specifically, an interlocking shaft for interlocking and connecting the detection shaft of the shift position sensor is connected to the shift drum in such a manner so as to be coaxial with a rotational axis line of the shift drum and be incapable of rotation relative to the shift drum. Furthermore, in the shift arm, an engagement hole having an elongate hole shape extends along one diameter line of the shift spindle in such a manner as to allow insertion and engagement of the locking pin. An insertion hole extends into an arc shape centered at a center axis line of the shift spindle in such a manner so as to allow insertion of the interlocking shaft. In addition, at least a part penetrating through the insertion hole in the interlocking shaft is formed with a diameter smaller than the diameter of the locking pin and the width of the insertion hole is set smaller than the width of the engagement hole.

According to an embodiment of the present invention, the engagement hole is formed so as to continue to a longitudinally center part of the insertion hole and extend to the opposite side to the shift spindle.

According to an embodiment of the present invention, the interlocking shaft is formed so that a part on the side of the shift drum is larger in diameter than the part inserted in the insertion hole.

According to an embodiment of the present invention, a pawl ratchet mechanism having a cup-shaped rotating component that rotates together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle. Furthermore, the interlocking shaft penetrating the shifter assembly in such a manner so as to rotatably support the shifter assembly is press-fitted into the rotating component fixed to the shift drum.

According to an embodiment of the present invention, a pawl ratchet mechanism having a cup-shaped rotating component that rotates together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle. Furthermore, the interlocking shaft is coaxially press-fitted to a bolt that penetrates the shifter assembly in such a manner so as to rotatably support the shifter assembly and fastens the rotating component to the shift drum.

According to an embodiment of the present invention, an engagement groove extending into a straight line shape in such a manner wherein both ends are opened at the outer circumference of the interlocking shaft is formed at an axial end of the interlocking shaft on the side of the shift position sensor. An engagement pin fitted into the engagement groove is provided on a joint component connected to the detection shaft in such a manner so as to be incapable of rotation relative to the detection shaft.

According to an embodiment of the present invention, the joint component is formed into a stepped cylindrical shape having a smaller-diameter tubular part into which the interlocking shaft is fitted and a larger-diameter tubular part coaxially continuing to the smaller-diameter tubular part in such a manner so as to allow insertion of the detection shaft.

According to an embodiment of the present invention, a second engagement pin fitted into an engagement recess that is formed at an end part of the joint component on the side of the shift position sensor and is located on one diameter line of the joint component is provided on the detection shaft perpendicularly to a center axis line of the detection shaft.

According to an embodiment of the present invention, the shift arm includes the engagement hole and the insertion hole. The engagement hole has an elongate hole shape extending along one diameter line of the shift spindle in such a manner so as to allow insertion and engagement of the locking pin. The insertion hole extends into an arc shape and allows insertion of the interlocking shaft connected to the shift drum in such a manner so as to interlock and connect the detection shaft of the shift position sensor and is incapable of rotation relative to the shift drum. Furthermore, at least the part penetrating through the insertion hole in the interlocking shaft is smaller in diameter than the locking pin and the width of the insertion hole is smaller than that of the engagement hole. Therefore, the opening area of the insertion hole made in the shift arm can be set comparatively small. Moreover, because the locking pin is engaged with the engagement hole, the shift arm is not pressed by the locking pin in the axial direction and the friction surface between the shift arm and the locking pin can be reduced. As a result, smooth gear shifting is enabled with suppression of the lowering of the rigidity of the shift arm.

According to an embodiment of the present invention, the engagement hole continuing to the longitudinally center part of the insertion hole extends to the opposite side to the shift spindle. Thus, the engagement hole and the insertion hole can be formed symmetrically with respect to a straight line passing through the rotational axis line of the shift arm. Accordingly, the engagement hole and the insertion hole are made without imbalance in the opening part in the shift arm and the rigidity of the shift arm can be ensured.

According to an embodiment of the present invention, the part on the shift position sensor side in the interlocking shaft is formed with a smaller diameter in view of the fact that it is not required to have high rigidity. Therefore, the width of the insertion hole can be set small, and the connecting force of the interlocking shaft with the shift drum can be enhanced by forming the interlocking shaft with the larger diameter on the shift drum side, wherein a high rigidity is necessary.

According to an embodiment of the present invention, the interlocking shaft penetrating the shifter assembly that serves as part of the pawl ratchet mechanism and has the locking pin in such a manner so as to rotatably support this shifter assembly is press-fitted into the rotating component fixed to the shift drum as part of the pawl ratchet mechanism. Therefore, a dedicated component for connecting the interlocking shaft to the shift drum is unnecessary and the number of components can be reduced.

According to an embodiment of the present invention, the interlocking shaft is coaxially press-fitted to the bolt penetrating the shifter assembly that serves as part of the pawl ratchet mechanism and has the locking pin in such a manner so as to rotatably support this shifter assembly. This allows free setting of the relative positions of the shift position sensor and the bolt. Thus, application to a plurality of models and a plurality of kinds of shift position sensors is permitted, which can enhance the versatility.

According to an embodiment of the present invention, the engagement pin provided on the joint component connected to the detection shaft in such a manner so as to be incapable of rotation relative to the detection shaft is fitted into the engagement groove formed at the axial end of the interlocking shaft on the shift position sensor side. This facilitates the work of interlocking and connecting the interlocking shaft and the detection shaft. Thus, the assemblability is enhanced.

According to an embodiment of the present invention, the joint component is formed into a stepped cylindrical shape with a larger diameter on the detection shaft side. This makes it easy to rotate the joint component and align it with the shift position sensor with the joint component assembled to the interlocking shaft at the time of the work of connecting the interlocking shaft and the shift position sensor. Thus, the work of assembling the shift position sensor becomes easy.

According to an embodiment of the present invention, the second engagement pin provided on the detection shaft is fitted into the engagement recess formed at the end part of the joint component on the shift position sensor side. Therefore, it is easy to rotate and align the detection shaft by the second engagement pin at the time of the work of connecting the interlocking shaft and the shift position sensor. Thus, the work of assembling the shift position sensor becomes easy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described with reference to the accompanying drawings.

Figure 1:
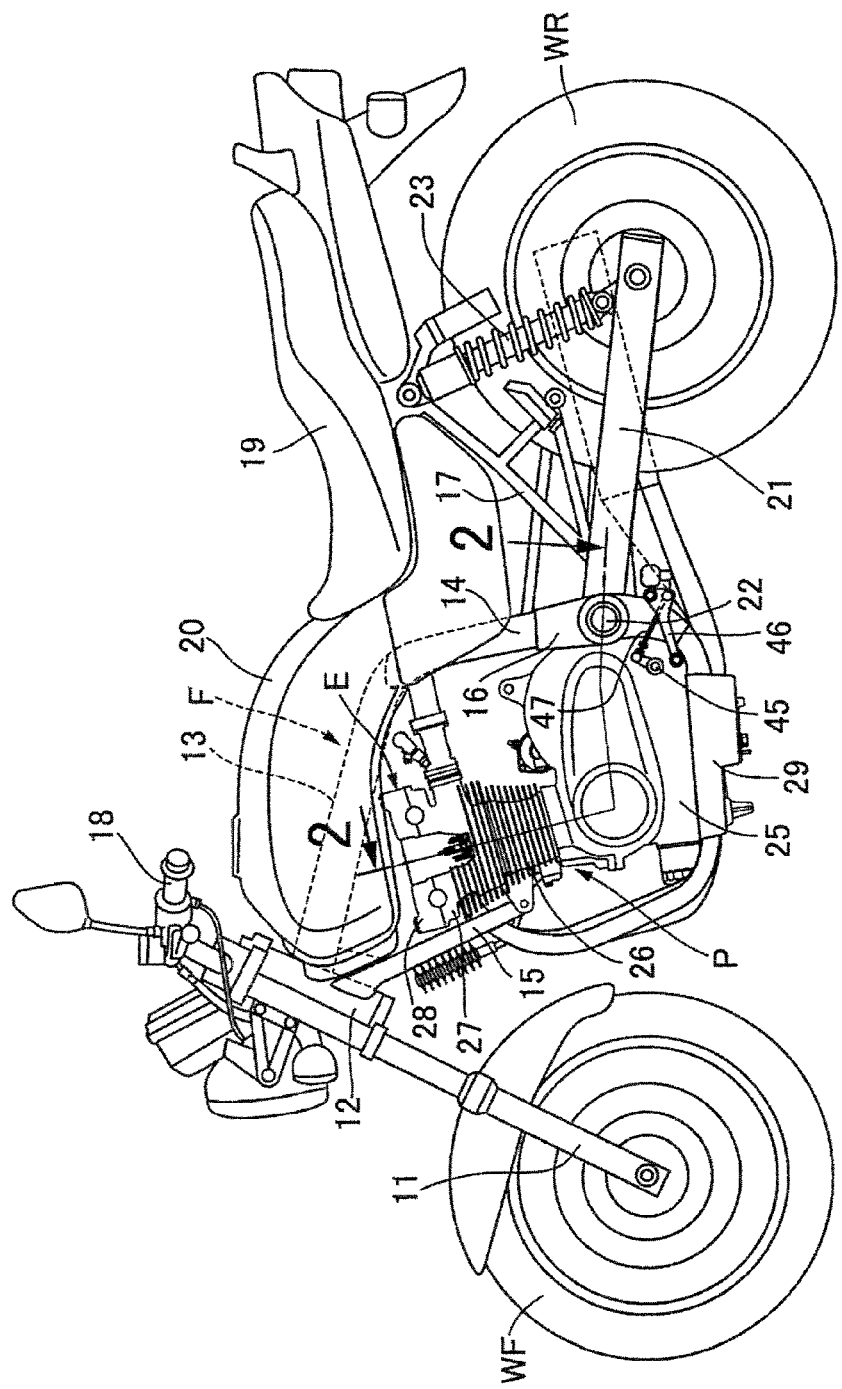
FIG. 1 is a side view of a motorcycle of a first embodiment.

A first embodiment of the present invention will be described with reference to FIGS. 1 to 6. Referring first to FIG. 1, a vehicle body frame F of a motorcycle as a saddle-type vehicle includes the following components a head pipe 12 that steerably supports a front fork 11 rotatably supporting a front wheel WF at its lower end part, a main frame 13 extending rearwardly from this head pipe 12, a pair of left and right center frames 14 extending downwardly from the rear end of this main frame 13, a pair of left and right down frames 15 extending rearwardly and downwardly from the head pipe 12 with a steeper inclination angle compared with the main frame 13, a pair of left and right pivot plates 16 provided at the lower end parts of the center frames 14 and a pair of left and right rear frames 17 extending rearwardly from the upper parts of the center frames 14 and the pivot plates 16.

A steering handlebar 18 is connected to the upper end of the front fork 11 and a riding seat 19 is provided above the rear frames 17. A fuel tank 20 straddling the main frame 13 in front of the riding seat 19 is attached to the main frame 13.

At the part surrounded by the main frame 13, the center frames 14 and the down frames 15, a power unit P is disposed so as to be supported by the down frames 15 and the pivot plates 16.

On the pivot plates 16, the front end parts of swing arms 21 that rotatably support, at their rear end parts, a rear wheel WR as a drive wheel driven by the power unit P are slidably supported with the intermediary of a support shaft 22. A rear shock absorber unit 23 is provided between the rear frames 17 and the swing arms 21.

Figure 2:
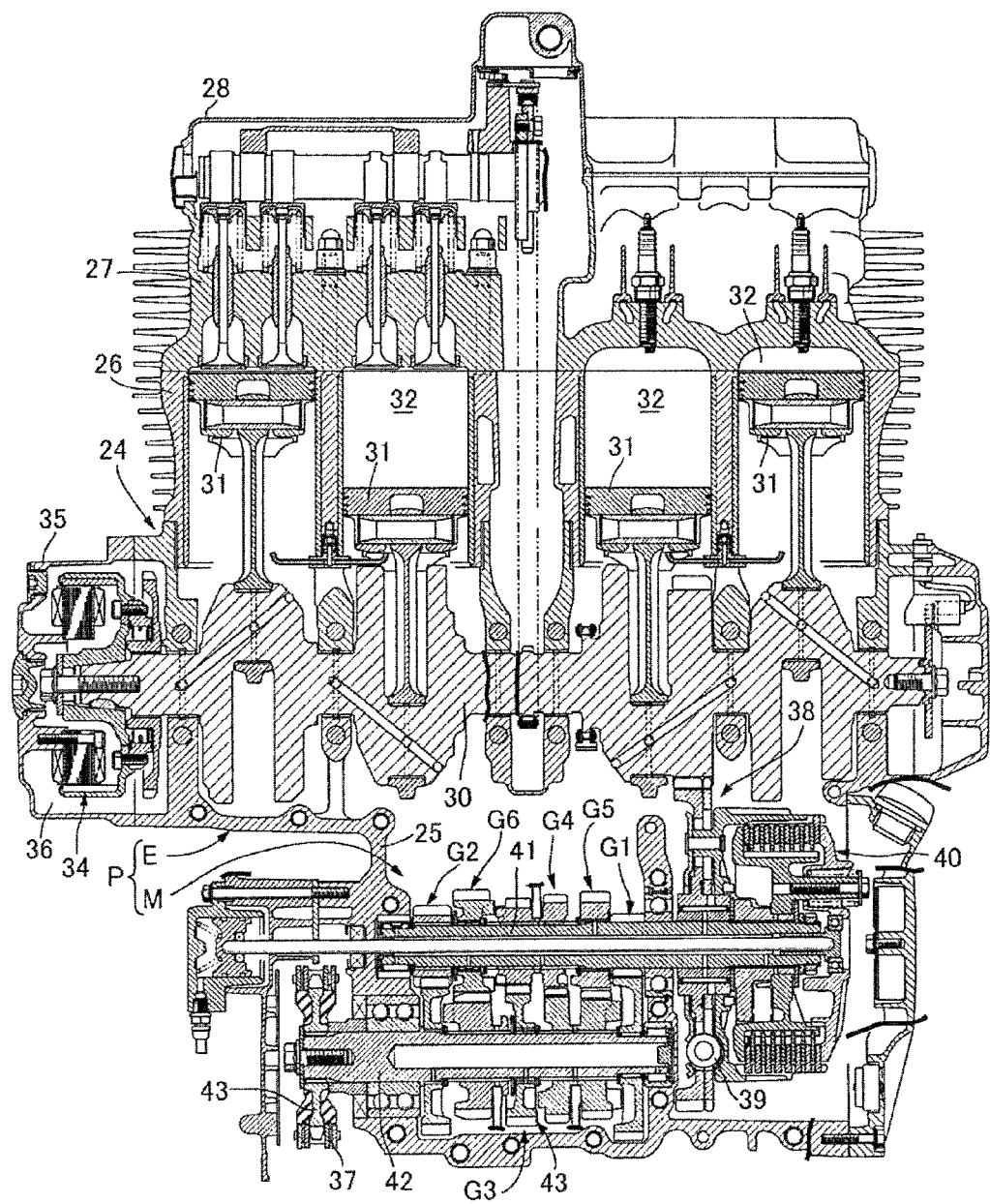
FIG. 2 is an enlarged sectional view along line 2-2 in FIG. 1.

Referring to FIG. 2, the power unit P is composed of an engine E as a drive source and a transmission M provided in a power train system between this engine E and the rear wheel WR.

An engine main body 24 of the engine E includes a crankcase 25, a cylinder block 26, a cylinder head 27 and a head cover 28 and is formed as an inline-four engine. An oil pan 29 (see FIG. 1) is joined to the lower part of the crankcase 25. In the crankcase 25, a crankshaft 30 having a rotational axis line extending along the vehicle width direction is rotatably supported.

Pistons 31 slidably fitted into the cylinder block 26 on each cylinder basis are connected to the crankshaft 30 in common with combustion chambers 32 formed at the tops of the respective pistons 31 are formed between the cylinder block 26 and the cylinder head 27 on each cylinder basis.

An electric generator 34 is joined to one end of the crankshaft 30. This electric generator 34 is housed in an electric generator room 36 formed between an electric generator cover 35 connected to the crankcase 25 and the crankcase 25. The rotational power of the crankshaft 30 is transmitted to the rear wheel WR of the motorcycle via an endless chain 37. More specifically, the rotational power of the crankshaft 30 is transmitted to the chain 37 via a primary reduction gear 38, a damper spring 39, a start clutch 40 and the transmission M.

The transmission M includes a main shaft 41, a countershaft 42 and gear trains of a plurality of shift stages, specifically e.g. first to sixth gear trains G1, G2, G3, G4, G5, and G6. To the main shaft 41, the rotational power of the crankshaft 30 is input via the damper spring 39 and the start clutch 40. The countershaft 42 has an axis line parallel to the main shaft 41. In addition, a drive sprocket 43 around which the chain 37 is wound is fixed at a protrusion part from the crankcase 25. The first to sixth gear trains G1 to G6 allow selective establishment of the shift stage and are provided between the main shaft 41 and the countershaft 42. The first to sixth gear trains G1 to G6 are each so formed that a drive gear and a driven gear making a pair mesh with each other.

Figure 3:
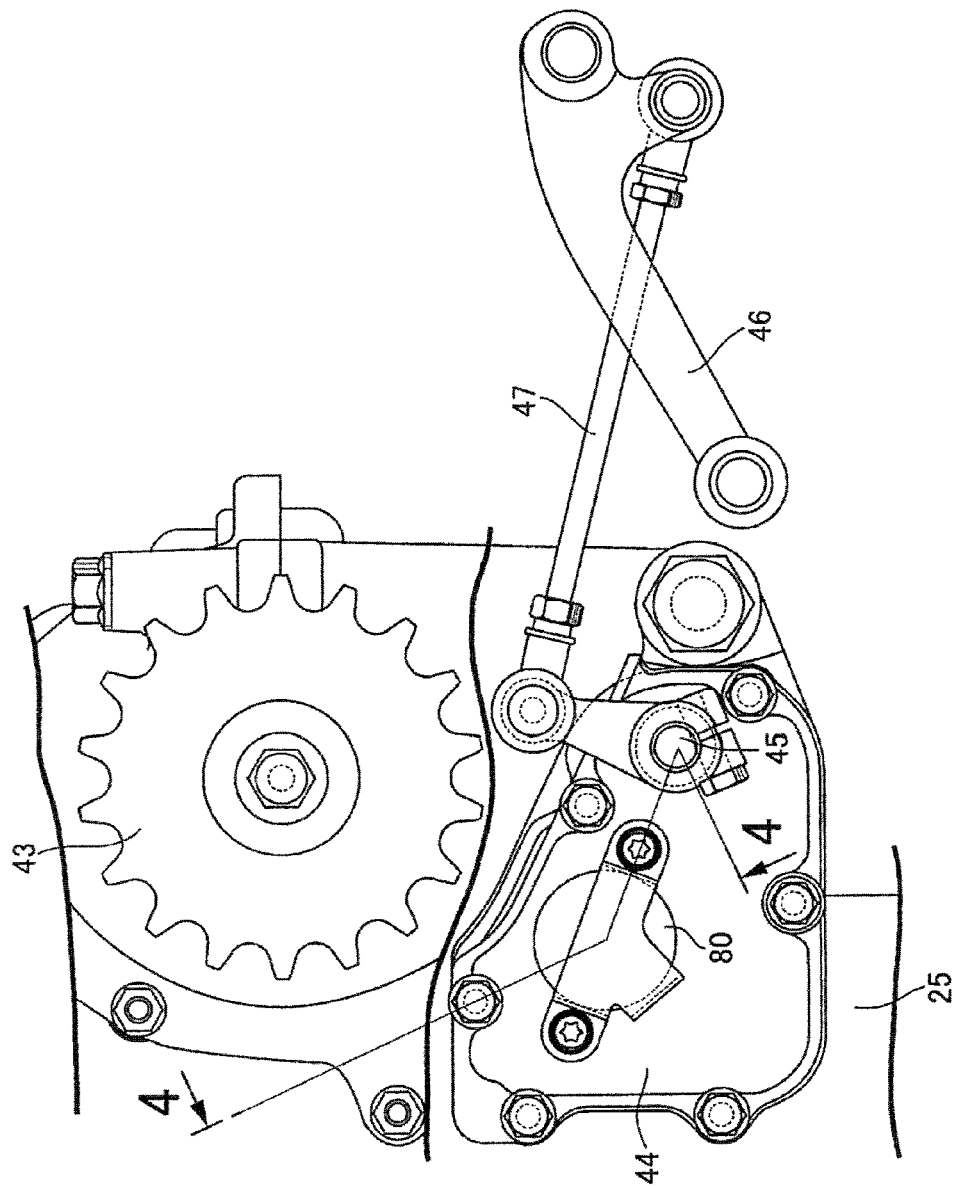
FIG. 3 is an enlarged view of a major part in FIG. 1.

Referring also to FIG. 3, below the drive sprocket 43, a shift spindle 45 is rotatably supported on the lower part of the left sidewall of the crankcase 25 and a cover component 44 that covers the lower part of the left sidewall of the crankcase 25 and is connected to this crankcase 25. To this shift spindle 45, a change pedal 46 rotatably supported by the left pivot plate 16 is connected via a link 47. A gear shifting operating force from the change pedal 46 is input to the shift spindle 45.

Figure 4:
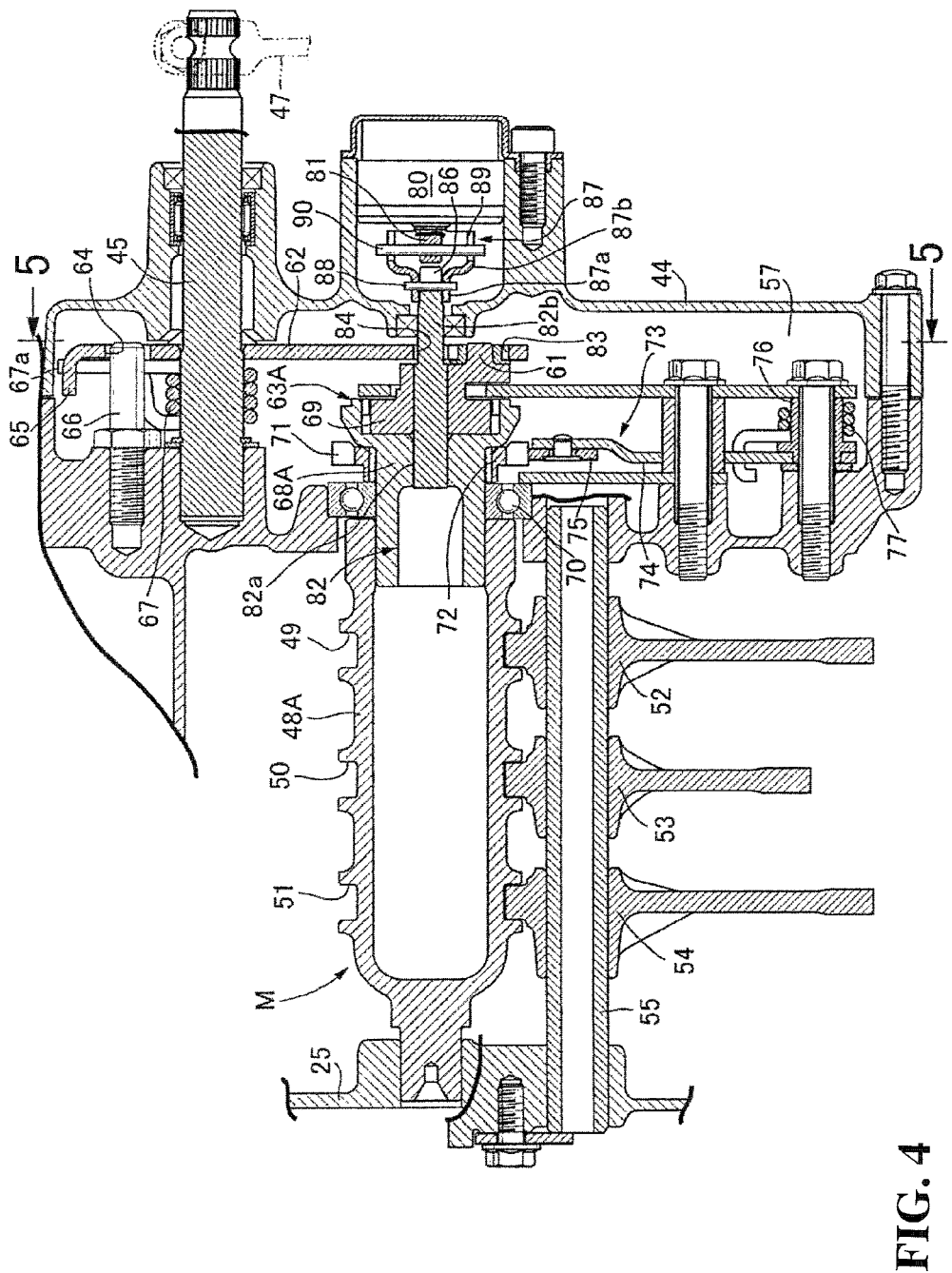
FIG. 4 is a sectional view along line 4-4 in FIG. 3.

Referring also to FIG. 4, the transmission M has a shift drum 48A and shift forks 52, 53, and 54 in addition to the main shaft 41, the countershaft 42 and the first to sixth gear trains G1 to G6. The shift drum 48A can rotate about an axis line parallel to the main shaft 41 and the countershaft 42 in order to selectively establish one of the first to sixth gear trains G1 to G6 and is rotatably supported by the crankcase 25. The shift forks 52, 53, and 54 engage with guide grooves 49, 50, and 51 made in the outer circumference of the shift drum 48A and are supported by a shift fork shaft 55 movably in the axial direction. The shift fork shaft 55 has an axis line parallel to the shift drum 48A and is supported by the crankcase 25.

The shift spindle 45 serves as part of a change mechanism 56 that rotates the shift drum 48A according to input of a gear shifting operating force. Most parts of this change mechanism 56 is housed in a change mechanism room 57 formed between the left sidewall of the crankcase 25 and the cover component 44.

Figure 5:
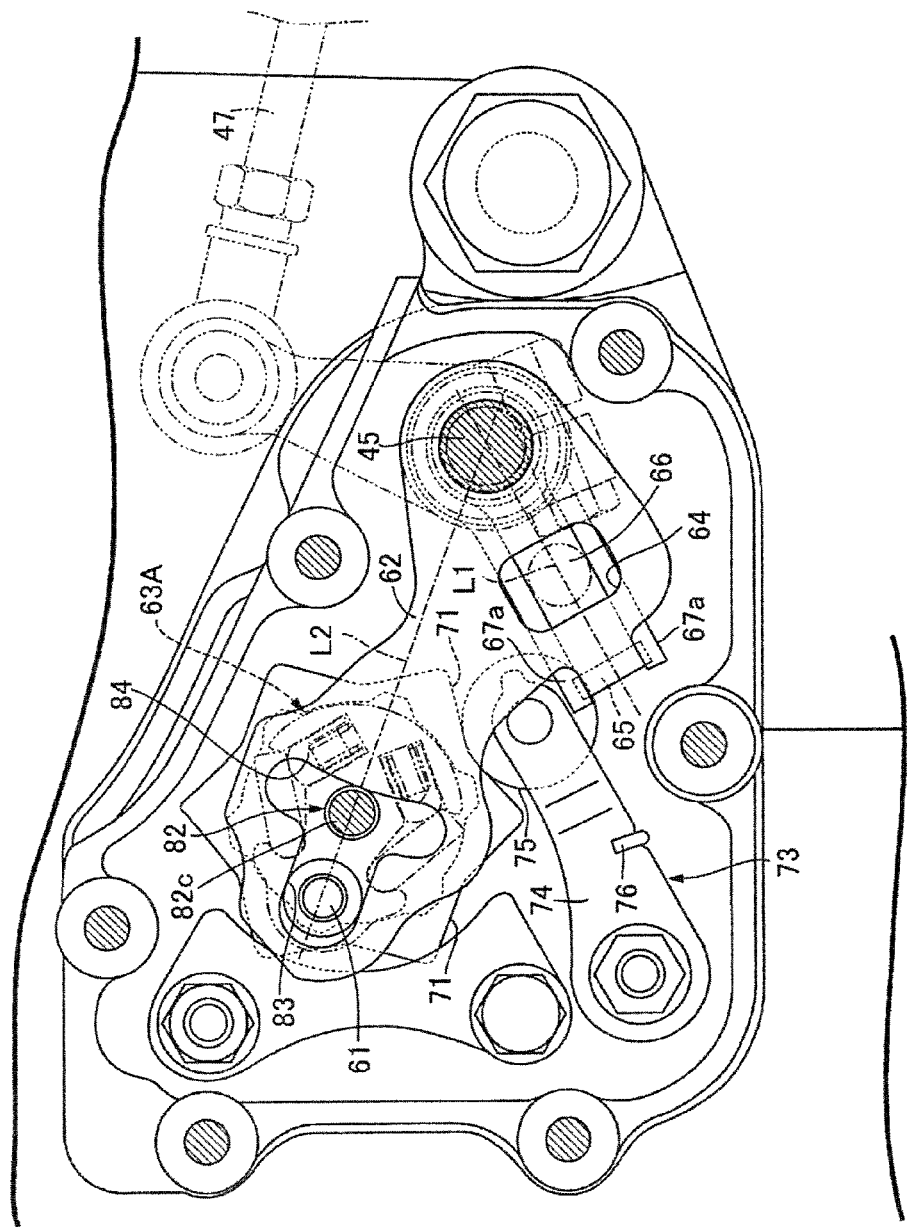
FIG. 5 is a sectional view along line 5-5 in FIG. 4.

Referring also to FIG. 5, the change mechanism 56 has a shift arm 62 and a pawl ratchet mechanism 63A. The shift arm 62 engages with a locking pin 61 provided on the side of the shift drum 48A and is fixed to the shift spindle 45. The pawl ratchet mechanism 63A is provided between the shift arm 62 and the shift drum in such a manner so as to convert one round of reciprocal rotation of the shift spindle 45 and the shift arm 62 to rotation of the shift drum 48A by a predetermined angle.

Figure 6:
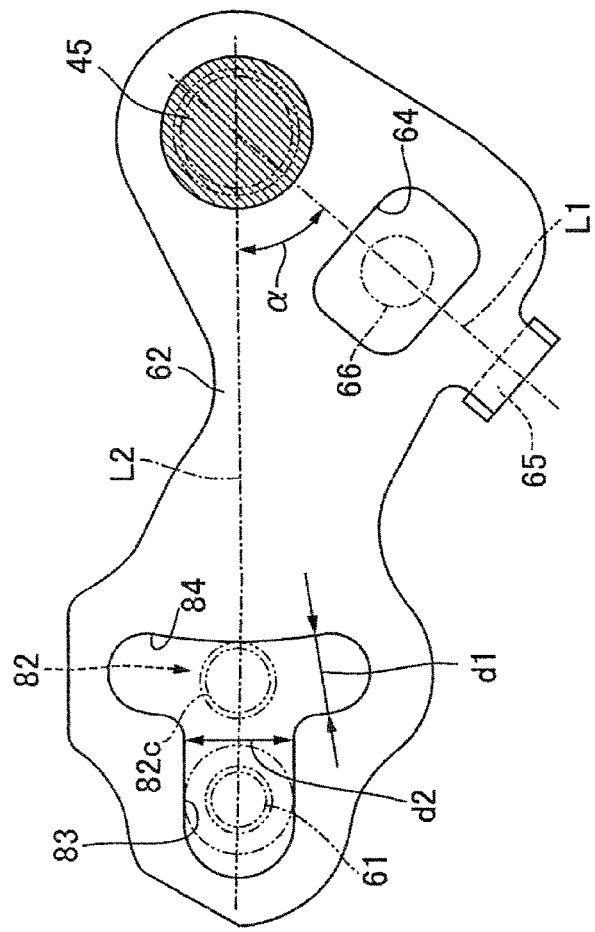
FIG. 6 is a front view of a shift arm.

Referring also to FIG. 6, at the base part of the shift arm 62 on the side of the shift spindle 45, an elongate hole 64 that is long in the direction perpendicular to a first straight line L1 passing through the center axis line of the shift spindle 45 is made and a protrusion 65 located on the first straight line L1 is made in the shift arm 62 in such a manner so as to sandwich the elongate hole 64 between it and the shift spindle 45.

Meanwhile, one end part of a pin 66 inserted in the elongate hole 64 is fixed on the left sidewall of the crankcase 25, and a clamp spring 67 having, at its both ends, a pair of clamp arms 67a that sandwich the protrusion 65 and the pin 66 from both sides is disposed between the shift arm 62 and the crankcase 25 in such a manner so as to surround the shift spindle 45. This makes the shift arm 62 to be biased toward a reference position at which the protrusion 65 and the pin 66 are arranged on the first straight line L1.

The pawl ratchet mechanism 63A is a known one having a cup-shaped rotating component 68A that rotates together with the shift drum 48A and a shifter assembly 69 that has the locking pin 61 at a position offset from the rotational axis line of the shift drum 48A and is rotatably housed in the rotating component 68A.

The rotating component 68A is press-fitted to one end part of the shift drum 48A and a ball bearing 70 is provided between this rotating component 68A and the crankcase 25. Furthermore, in the change mechanism room 57, a ring component 72 having notches 71 individually corresponding to the first to sixth positions at its outer circumference is fixed to the rotating component 68A and a drum stopper arm 73 is selectively engaged with these notches 71.

This drum stopper arm is composed of an arm 74 and a roller 75. The base end part of the arm 74 is rotatably journaled by a support shaft 76 that has an axis line parallel to the shift spindle 45 and is provided on the crankcase 25. The roller 75 is journaled by the tip of the arm 74 in such a manner so as to engage with one of the respective notches 71. A twisted spring 77 is provided between the base end part of the arm 74 and the crankcase 25. To engage the roller 75 with one of the respective notches 71, the arm 74 is biased toward the rotation center of the ring component 72, i.e. the center axis line of the shift drum 48A, by a spring force exerted by the twisted spring 77.

The rotational position of the shift drum 48A is detected by a shift position sensor 80 attached to the cover component 44. This shift position sensor 80 has a detection shaft 81 coaxial with the shift drum 48A and an interlocking shaft 82 for interlocking and connecting the detection shaft 81 is connected to the shift drum 48A in such a manner so as to be coaxial with the rotational axis line of the shift drum 48A and be incapable of rotation relative to it.

The interlocking shaft 82 is press-fitted into the rotating component 68A fixed to the shift drum 48A and penetrates the shifter assembly 69 in such a manner so as to rotatably support this shifter assembly 69.

Meanwhile, an engagement hole 83 and an insertion hole 84 are made in the shift arm 62. The engagement hole 83 has an elongated hole shape extending along one diameter line of the shift spindle 45 in such a manner so as to allow insertion and engagement of the locking pin 61. The insertion hole 84 extends into an arc shape centered at the center axis line of the shift spindle 45 in such a manner so as to allow insertion of the interlocking shaft 82. At least the part penetrating through the insertion hole 84 in the interlocking shaft 82 is formed with a diameter smaller than that of the locking pin 61.

In this embodiment, the interlocking shaft 82 is formed so as to monolithically have a larger-diameter part 82*a* and a smaller-diameter part 82*b* whose diameter is smaller than that of this larger-diameter part 82*a* in that order from the side of the shift drum 48A. The larger-diameter part 82*a* is press-fitted into the rotating component 68A and penetrates this rotating component 68A and the shifter assembly 69, and the smaller-diameter part 82*b* is inserted in the insertion hole 84 of the shift arm 62.

In addition, because the interlocking shaft 82 is smaller in diameter than the locking pin 61 at the part inserted in the insertion hole 84, width d1 of the insertion hole 84 is set smaller than width d2 of the engagement hole 83.

Furthermore, the engagement hole 83 extends long along a second straight line L2 that passes through the center axis line of the shift spindle 45 and extends along a direction forming an angle α with the first straight line L1, and is formed so as to continue to the longitudinally center part of the insertion hole 84 and extend to the opposite side to the shift spindle 45.

At the axial end of the interlocking shaft 82 on the side of the shift position sensor 80, i.e. the axial end of the smaller-diameter part 82*b* on the side of the shift position sensor 80, an engagement groove 86 is formed that is located on one diameter line of the smaller-diameter part 82*b* and has both ends opened at the outer circumference of this smaller-diameter part 82*b*. A first engagement pin 88 fitted into the engagement groove 86 is provided on a joint component 87 connected to the detection shaft 81 in such a manner so as to be incapable of rotation relative to it.

In addition, the joint component 87 is formed into a stepped cylindrical shape having a smaller-diameter tubular part 87*a* into which the smaller-diameter part 82*b* of the interlocking shaft 82 is fitted and a larger-diameter tubular part 87*b* coaxially continuing to the smaller-diameter tubular part 87*a* in such a manner so as to allow insertion of the detection shaft 81. A second engagement pin 90, fitted into an engagement recess 89 that is formed at the end part of the joint component 87 on the side of the shift position sensor 80 and is located on one diameter line of this joint component 87, is provided on the detection shaft 81 perpendicularly to the center axis line thereof.

Next, the effects of this embodiment will be described. The interlocking shaft 82 for interlocking and connecting the detection shaft 81 of the shift position sensor 80 is connected to the shift drum 48A in such a manner so as to be coaxial with the rotational axis line of the shift drum 48A and be incapable of rotation relative to it. Furthermore, in the shift arm 62, the engagement hole 83 having an elongate hole shape extending along one diameter line of the shift spindle in such a manner so as to allow insertion and engagement of the locking pin 61 and the insertion hole 84 extending into an arc shape centered at the center axis line of the shift spindle 45 in such a manner as to allow insertion of the interlocking shaft 82 are formed. In addition, at least the part penetrating through the insertion hole 84 in the interlocking shaft 82 is formed with a diameter smaller than that of the locking pin 61 and the width d1 of the insertion hole 84 is set smaller than the width d2 of the engagement hole 83. Therefore, the opening area of the insertion hole 84 made in the shift arm 62 can be set comparatively small. Moreover, because the locking pin 61 is engaged with the engagement hole 83, the shift arm 62 is not pressed by the locking pin 61 in the axial direction and the friction surface between the shift arm 62 and the locking pin 61 can be reduced. As a result, smooth gear shifting is enabled with suppression of the lowering of the rigidity of the shift arm 62.

Furthermore, the engagement hole 83 is formed so as to continue to the longitudinally center part of the insertion hole 84 and extend to the opposite side to the shift spindle 45. Thus, the engagement hole 83 and the insertion hole 84 can be formed symmetrically with respect to the second straight line L2 passing through the rotational axis line of the shift arm 62 and the widthwise center of the engagement hole 83. Accordingly, the engagement hole 83 and the insertion hole 84 are made without imbalance in the opening part in the shift arm 62. Thus, the rigidity of the shift arm 62 can be ensured.

In addition, the interlocking shaft 82 is formed so that the part on the side of the shift drum 48A is larger in diameter than the part inserted in the insertion hole 84, and the part on the side of the shift position sensor 80 in the interlocking shaft 82 is formed with a smaller diameter due to the fact that it is not required to have high rigidity. Therefore, the width of the insertion hole 84 can be set small, and the connecting force of the interlocking shaft 82 with the shift drum 48A can be enhanced by forming the interlocking shaft 82 with the larger diameter on the side of the shift drum 48A, on which a high rigidity is necessary.

Moreover, the interlocking shaft 82 penetrating the shifter assembly 69 serving as part of the pawl ratchet mechanism 63A in such a manner so as to rotatably support this shifter assembly 69 is press-fitted into the rotating component 68A fixed to the shift drum 48A. Therefore, a dedicated component for connecting the interlocking shaft 82 to the shift drum 48A is unnecessary. Thus, the number of components can be reduced.

Furthermore, the engagement groove 86 that is located on one diameter line of the interlocking shaft 82 and has both ends opened at the outer circumference of this interlocking shaft 82 is formed at the axial end of the interlocking shaft 82 on the side of the shift position sensor 80, and the first engagement pin 88 fitted into the engagement groove 86 is provided on the joint component 87 connected to the detection shaft 81 in such a manner so as to be incapable of rotation relative to it. This facilitates the work of interlocking and connecting the interlocking shaft 82 and the detection shaft 81 for enhancing the assemblability.

In addition, the joint component 87 is formed into a stepped cylindrical shape having the smaller-diameter tubular part 87*a* into which the interlocking shaft 82 is fitted and the larger-diameter tubular part 87*b* coaxially continuing to the smaller-diameter tubular part 87*a* in such a manner as to allow insertion of the detection shaft 81. This makes it easy to rotate the joint component 87 and align it with the shift position sensor 80 with the joint component 87 assembled to the interlocking shaft 82 at the time of the work of connecting the interlocking shaft 82 and the shift position sensor 80. Thus, the work of assembling the shift position sensor 80 becomes easy.

Moreover, the second engagement pin 90 fitted into the engagement recess 89 that is formed at the end part of the joint component 87 on the side of the shift position sensor 80 and is located on one diameter line of this joint component 87 is provided on the detection shaft 81 perpendicularly to the center axis line thereof. Therefore, it is easy to rotate and align the detection shaft 81 by the second engagement pin 90 at the time of the work of connecting the interlocking shaft 82 and the shift position sensor 80. Thus, the work of assembling the shift position sensor 80 becomes easy.

Figure 7:
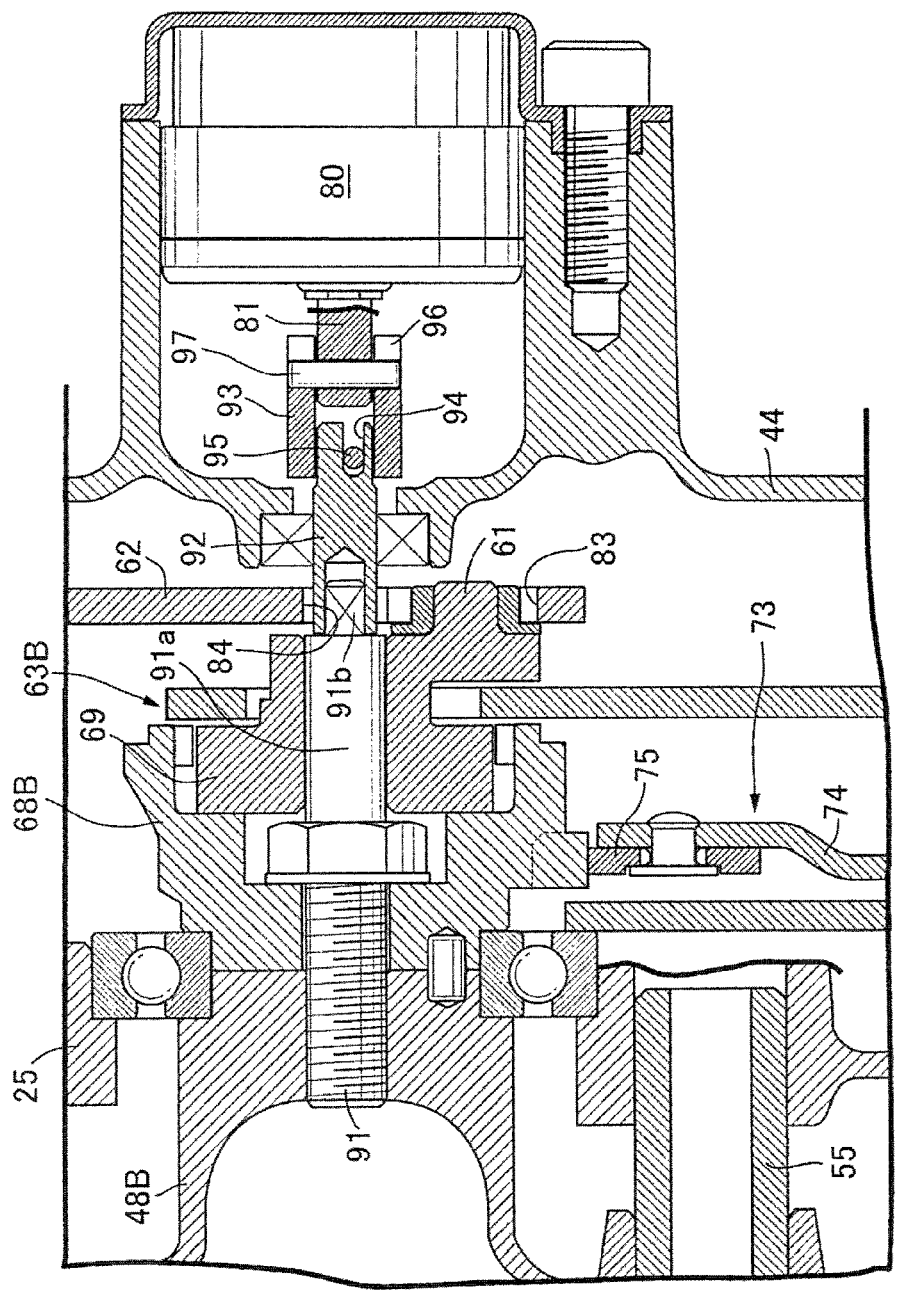
FIG. 7 is a sectional view showing a structure to interlock and connect a shift position sensor and a shift drum in a second embodiment.

FIG. 7 shows a second embodiment of the present invention. The part corresponding to the first embodiment is only shown in the diagram with the same reference numeral. A detailed description thereof is omitted.

A pawl ratchet mechanism 63B provided between a shift arm 62 and a shift drum 48B in such a manner so as to convert one round of reciprocal rotation of the shift arm 62 to rotation of the shift drum 48B by a predetermined angle has a cup-shaped rotating component 68B coaxially fixed to the shift drum 48B by a bolt 91 and a shifter assembly 69 that has a locking pin 61 and is rotatably housed in the rotating component 68B. Notches 71 with which a roller 75 of a stopper arm 73 is engaged are formed at the outer circumference of the rotating component 68B.

The rotational position of the shift drum 48B is detected by a shift position sensor 80 attached to the cover component 44. A detection shaft 81 that is possessed by this shift position sensor 80 and is coaxial with the shift drum 48B is interlocked and connected, via a joint component 93, with an interlocking shaft 92 connected to the shift drum 48B in such a manner so as to be coaxial with the rotational axis line of the shift drum 48B and is incapable of rotation relative to it.

The bolt 91 monolithically has an extending shaft part 91*a* that coaxially penetrates the shifter assembly 69 and rotatably supports this shifter assembly 69 and a press-fitting shaft part 91*b* continuing to this extending shaft part 91*a*. The press-fitting shaft part 91*b* has a non-circular cross-sectional shape and protrudes from the shifter assembly 69. The interlocking shaft 92 formed with a smaller diameter compared with the locking pin 61 is press-fitted to the press-fitting shaft part 91*b*.

The joint component 93 is formed into a cylindrical shape in such a manner that the other end part of the interlocking shaft 92 and the detection shaft 81 of the shift position sensor 80 are fitted into both end parts of the joint component 93. At the axial end of the interlocking shaft 92 on the side of the shift position sensor 80, an engagement groove 94 is formed that extends into a straight line shape at a position offset from the center line of the axis of rotation of the interlocking shaft 92 and has both ends opened at the outer circumference of this interlocking shaft 92. A first engagement pin 95 fitted into the engagement groove 94 is provided on the joint component 93.

Furthermore, a second engagement pin 97 fitted into an engagement recess 96 that is formed at the end part of the joint component 93 on the side of the shift position sensor 80 and is located on one diameter line of the joint component 93 is provided on the detection shaft 81 perpendicularly to the center axis line thereof.

According to this second embodiment, the interlocking shaft 92 is coaxially press-fitted to the bolt 91 penetrating the shifter assembly 69 in such a manner so as to rotatably support the shifter assembly 69, which serves as part of the pawl ratchet mechanism 63B and has the locking pin 61. This allows free setting of the relative positions of the shift position sensor 80 and the bolt 91. Thus, application to a plurality of models and a plurality of kinds of shift position sensors 80 is permitted. Thus, the versatility is enhanced.

Furthermore, the first engagement pin 95 provided on the joint component 93 is fitted into the engagement groove 94 extending into a straight line shape at a position offset from the center axis line of the interlocking shaft 92. This uniquely settles the circumferential relative positions of the joint component 93 and the interlocking shaft 92.

Figure 8:
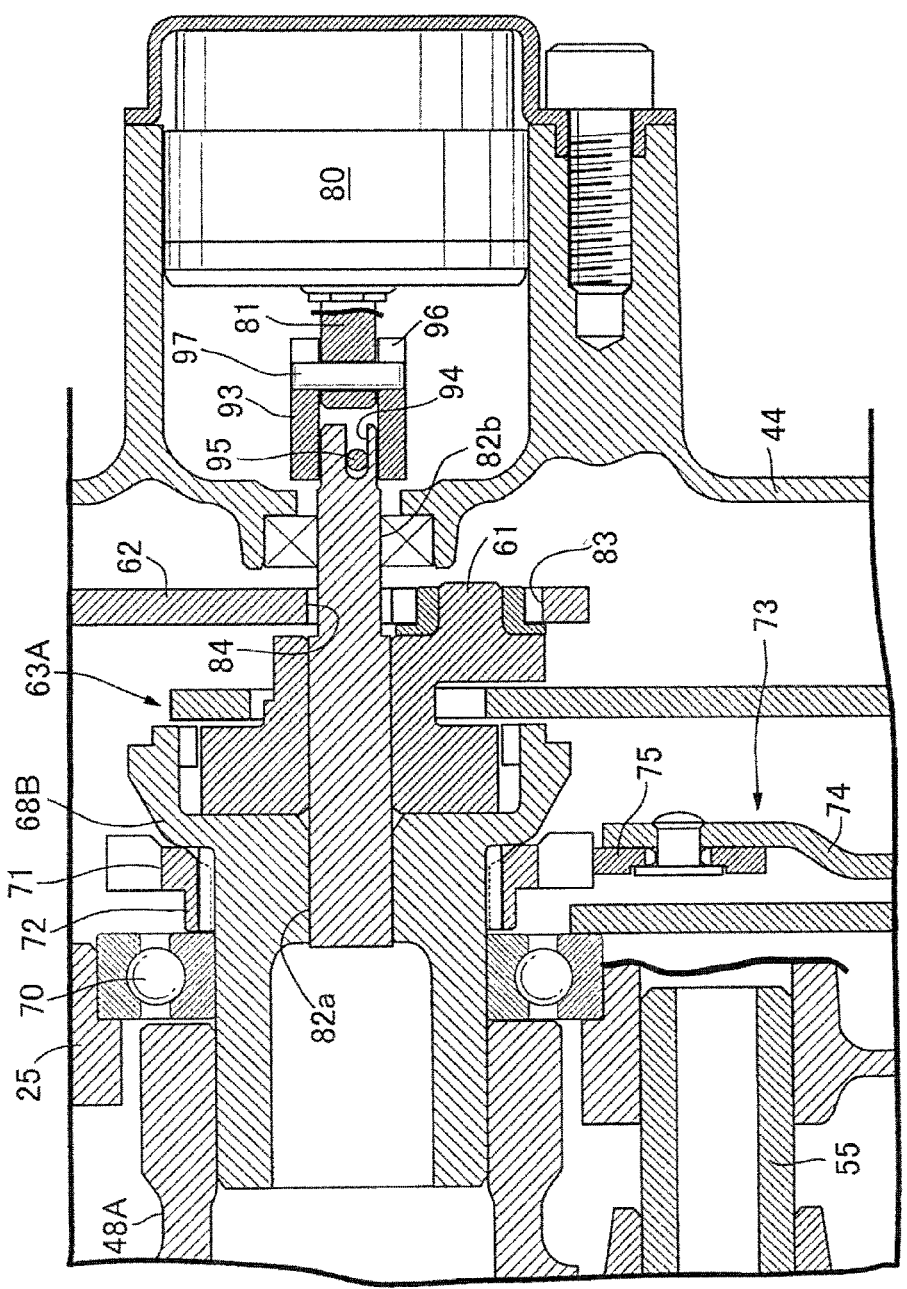
FIG. 8 is a sectional view corresponding to FIG. 7 of a third embodiment.

As a third embodiment of the present invention, as shown in FIG. 8, the interlocking shaft 82 penetrating the shifter assembly 69 in such a manner so as to rotatably support the shifter assembly 69 serving as part of the pawl ratchet mechanism 63A may be connected to the detection shaft 81 of the shift position sensor 80 via the joint component 93.

The embodiments of the present invention are described above. However, the present invention is not limited to the above-described embodiments and it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A power unit for a saddle vehicle wherein:
   gear trains of a plurality of shift stages one of which is selectively established according to rotation of a shift drum are provided in a power train system between a drive source that exerts a driving force and a drive wheel;
   a change mechanism that rotates the shift drum includes a shift spindle that rotates according to input of a gear shifting operating force and a shift arm that engages with a locking pin provided on a side of the shift drum and is fixed to the shift spindle; and
   a detection shaft of a shift position sensor for detecting a rotational position of the shift drum is interlocked and connected with the shift drum;
   the power unit for a saddle vehicle comprising:
   an interlocking shaft for interlocking and connecting the detection shaft of the shift position sensor is connected to the shift drum in such a manner so as to be coaxial with a rotational axis line of the shift drum and is incapable of rotation relative to the shift drum;
   in the shift arm, an engagement hole is formed having an elongate hole shape extending along one diameter line of the shift spindle in such a manner so as to allow insertion and engagement of the locking pin and an insertion hole is formed extending into an arc shape centered at a center axis line of the shift spindle in such a manner so as to allow insertion of the interlocking shaft;

at least a part penetrating through the insertion hole in the interlocking shaft is formed with a diameter smaller than a diameter of the locking pin and a width of the insertion hole is set smaller than a width of the engagement hole; and a second engagement pin, fitted into an engagement recess, is formed at an end part of a joint component on the side of the shift position sensor and is located on one diameter line of the joint component said second engagement pin is provided in parallel to a first engagement pin fitted into the engagement groove provided on the joint component connected to the detection shaft in such a manner so as to be incapable of rotation relative to the detection shaft.

2. The power unit for a saddle vehicle according to claim 1, wherein the engagement hole is formed so as to continue to a longitudinally center part of the insertion hole and extend to an opposite side to the shift spindle.

3. The power unit for a saddle vehicle according to claim 2, wherein the interlocking shaft is formed so that a part on the side of the shift drum is larger in diameter than the part inserted in the insertion hole.

4. The power unit for a saddle vehicle according to claim 2, wherein a pawl ratchet mechanism having a cup-shaped rotating component that rotates together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle; and the interlocking shaft penetrating the shifter assembly in such a manner so as to rotatably support the shifter assembly is press-fitted into the rotating component fixed to the shift drum.

5. The power unit for a saddle vehicle according to claim 2, wherein a pawl ratchet mechanism having a cup-shaped rotating component that rotates together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle; and the interlocking shaft is coaxially press-fitted to a bolt that penetrates the shifter assembly in such a manner so as to rotatably support the shifter assembly and fastens the rotating component to the shift drum.

6. The power unit for a saddle vehicle according claim 2, wherein an engagement groove is formed extending into a straight line shape in such a manner so that both ends are opened at outer circumference of the interlocking shaft at an axial end of the interlocking shaft on a side of the shift position sensor.

7. The power unit for a saddle vehicle according to claim 1, wherein the interlocking shaft is formed so that a part on the side of the shift drum is larger in diameter than the part inserted in the insertion hole.

8. The power unit for a saddle vehicle according to claim 7, wherein a pawl ratchet mechanism having a cup-shaped rotating component that rotates together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle; and the interlocking shaft penetrating the shifter assembly in such a manner so as to rotatably support the shifter assembly is press-fitted into the rotating component fixed to the shift drum.

9. The power unit for a saddle vehicle according claim 7, wherein an engagement groove is formed extending into a straight line shape in such a manner so that both ends are opened at outer circumference of the interlocking shaft at an axial end of the interlocking shaft on a side of the shift position sensor.

10. The power unit for a saddle vehicle according to claim 1, wherein a pawl ratchet mechanism having a cup-shaped rotating component that rotates together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle; and the interlocking shaft penetrating the shifter assembly in such a manner so as to rotatably support the shifter assembly is press-fitted into the rotating component fixed to the shift drum.

11. The power unit for a saddle vehicle according claim 10, wherein an engagement groove is formed extending into a straight line shape in such a manner so that both ends are opened at outer circumference of the interlocking shaft at an axial end of the interlocking shaft on a side of the shift position sensor, and an engagement pin fitted into the engagement groove is provided on a joint component connected to the detection shaft in such a manner so as to be incapable of rotation relative to the detection shaft.

12. The power unit for a saddle vehicle according to claim 1, wherein a pawl ratchet mechanism having a cup-shaped rotating component that rotates together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle; and the interlocking shaft is coaxially press-fitted to a bolt that penetrates the shifter assembly in such a manner so as to rotatably support the shifter assembly and fastens the rotating component to the shift drum.

13. The power unit for a saddle vehicle according claim 12, wherein an engagement groove is formed extending into a straight line shape in such a manner so that both ends are opened at outer circumference of the interlocking shaft at an axial end of the interlocking shaft on a side of the shift position sensor, and an engagement pin fitted into the engagement groove is provided on a joint component connected to the detection shaft in such a manner so as to be incapable of rotation relative to the detection shaft.

14. The power unit for a saddle vehicle according claim 1, wherein an engagement groove is formed extending into a straight line shape in such a manner so that both ends are opened at outer circumference of the interlocking shaft at an axial end of the interlocking shaft on a side of the shift position sensor.

15. The power unit for a saddle vehicle according to claim 14, wherein the joint component is formed into a stepped cylindrical shape having a smaller-diameter tubular part into which the interlocking shaft is fitted and a larger-diameter tubular part coaxially continuing to the smaller-diameter tubular part in such a manner so as to allow insertion of the detection shaft.

16. A power unit for a saddle vehicle having a change mechanism for rotating a shift drum, said change mechanism includes a shift spindle for rotating according to input of a gear shifting operating force and a shift arm that engages with a locking pin provided on a side of the shift drum and is fixed to the shift spindle and a detection shaft of a shift position sensor for detecting a rotational position of the shift drum, said detection shaft being interlocked and connected with the shift drum, the power unit for a saddle vehicle comprising:

- an interlocking shaft for interlocking and connecting the detection shaft of the shift position sensor is coaxially connected to the shift drum with a rotational axis line of the shift drum, said detection shaft being incapable of rotation relative to the shift drum;
- an engagement hole is formed in the shift arm, said engagement hole having an elongate hole shape extending along one diameter line of the shift spindle for allowing insertion and engagement of the locking pin;
- an insertion hole is formed in the shift arm, said insertion hole extending into an arc shape centered at a center axis line of the shift spindle for allowing insertion of an interlocking shaft;
- at least a part penetrating through the insertion hole in the interlocking shaft is formed with a diameter smaller than a diameter of the locking pin and a width of the insertion hole is set smaller than a width of the engagement hole; and
- a second engagement pin, fitted into an engagement recess, is formed at an end part of a joint component on the side of the shift position sensor and is located on one diameter line of the joint component said second engagement pin is provided in parallel to a first engagement pin fitted into the engagement groove provided on the joint component connected to the detection shaft in such a manner so as to be incapable of rotation relative to the detection shaft.

17. The power unit for a saddle vehicle according to claim 16, wherein the engagement hole is formed so as to continue to a longitudinally center part of the insertion hole and extend to an opposite side to the shift spindle.

18. The power unit for a saddle vehicle according to claim 16, wherein the interlocking shaft is formed so that a part on the side of the shift drum is larger in diameter than the part inserted in the insertion hole.

19. The power unit for a saddle vehicle according to claim 16, wherein a pawl ratchet mechanism having a cup-shaped rotating component for rotating together with the shift drum and a shifter assembly that has the locking pin and is rotatably housed in the rotating component is provided between the shift arm and the shift drum in such a manner so as to convert one round of reciprocal rotation of the shift spindle and the shift arm to rotation of the shift drum by a predetermined angle; and the interlocking shaft penetrating the shifter assembly in such a manner so as to rotatably support the shifter assembly is press-fitted into the rotating component fixed to the shift drum.

* * * * *